United States Patent
Xie et al.

(10) Patent No.: US 12,260,509 B2
(45) Date of Patent: *Mar. 25, 2025

(54) RECONSTRUCTION OF 3D MODEL WITH IMMERSIVE EXPERIENCE

(71) Applicant: eBay Inc., San Jose, CA (US)

(72) Inventors: Jinrong Xie, San Jose, CA (US); Qiaosong Wang, San Jose, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,583

(22) Filed: Jun. 29, 2023

(65) Prior Publication Data
US 2023/0343055 A1   Oct. 26, 2023

Related U.S. Application Data

(63) Continuation of application No. 16/006,263, filed on Jun. 12, 2018, now Pat. No. 11,727,656.

(51) Int. Cl.
*G06T 19/20* (2011.01)
*G06T 3/4092* (2024.01)
(Continued)

(52) U.S. Cl.
CPC ............ *G06T 19/20* (2013.01); *G06T 3/4092* (2013.01); *G06T 15/04* (2013.01); *G06T 17/20* (2013.01);
(Continued)

(58) Field of Classification Search
CPC .............................. G06T 19/20; G06T 3/4092
See application file for complete search history.

(56) References Cited

U.S. PATENT DOCUMENTS

| | | | |
|---|---|---|---|
| 5,526,478 A | 6/1996 | Russell et al. | |
| 5,850,463 A | 12/1998 | Horii | |

(Continued)

FOREIGN PATENT DOCUMENTS

| | | |
|---|---|---|
| CN | 101246599 | 8/2008 |
| CN | 101432776 | 5/2009 |

(Continued)

OTHER PUBLICATIONS

US 8,698,879 B2, 04/2014, Lee et al. (withdrawn)
(Continued)

*Primary Examiner* — Yi Yang
(74) *Attorney, Agent, or Firm* — FIG. 1 Patents

(57) ABSTRACT

A system receives image data associated with an item, where the image data comprising a view of the item from two or more angles; determines physical attributes of the item; generates a base model of the item; samples the base model to generate one or more sampled models, each of the one or more sampled models comprising a subset of the geometric data, the subset of the geometric data determined based on one or more device characteristics of one or more user devices that interface with the system; receives device characteristics of a user device associated with a request from the user device for the item; selects, based on the received device characteristics, a sampled model of the item; and transmits a data object comprising the selected sampled model to the user device to cause the user device to generate a three-dimensional rendering of the item.

18 Claims, 11 Drawing Sheets

(51) Int. Cl.
　　　*G06T 15/04*　　　(2011.01)
　　　*G06T 17/20*　　　(2006.01)
　　　*G06T 19/00*　　　(2011.01)
(52) U.S. Cl.
　　　CPC ........ *G06T 19/006* (2013.01); *G06T 2200/08* (2013.01); *G06T 2200/24* (2013.01); *G06T 2219/004* (2013.01); *G06T 2219/2016* (2013.01)

(56) References Cited

U.S. PATENT DOCUMENTS

| | | | |
|---|---|---|---|
| 6,144,388 | A | 11/2000 | Bornstein |
| 6,337,925 | B1 | 1/2002 | Cohen et al. |
| 6,420,698 | B1 | 7/2002 | Dimsdale |
| 6,434,278 | B1 | 8/2002 | Hashimoto |
| 6,563,504 | B1 | 5/2003 | Rose et al. |
| 7,689,035 | B2 | 3/2010 | Mallick et al. |
| 7,859,551 | B2 | 12/2010 | Bulman et al. |
| 8,289,318 | B1 | 10/2012 | Hadap et al. |
| 8,452,081 | B2 | 5/2013 | Wang et al. |
| 8,525,828 | B1 | 9/2013 | Bates |
| 8,605,989 | B2 | 12/2013 | Rudin et al. |
| 8,654,121 | B1 | 2/2014 | Yu et al. |
| 8,766,997 | B1 | 7/2014 | Hickman et al. |
| 9,047,706 | B1 | 6/2015 | Ogale |
| 9,094,670 | B1 | 7/2015 | Furio et al. |
| 9,204,123 | B2 | 12/2015 | Vrbas et al. |
| 9,269,196 | B1 | 2/2016 | Fan et al. |
| 9,589,362 | B2 | 3/2017 | Sarkis et al. |
| 9,962,921 | B1 | 5/2018 | Lyon |
| 10,586,379 | B2 | 3/2020 | Wang et al. |
| 11,205,299 | B2 | 12/2021 | Wang |
| 11,727,627 | B2 | 8/2023 | Wang et al. |
| 11,727,656 | B2 | 8/2023 | Xie et al. |
| 2001/0020946 | A1 | 9/2001 | Kawakami et al. |
| 2001/0043236 | A1 | 11/2001 | Yamamoto |
| 2002/0024517 | A1 | 2/2002 | Yamaguchi et al. |
| 2002/0057850 | A1 | 5/2002 | Sirohey et al. |
| 2003/0050864 | A1 | 3/2003 | Trajkovic et al. |
| 2003/0098868 | A1 | 5/2003 | Fujiwara et al. |
| 2003/0117411 | A1 | 6/2003 | Fujiwara et al. |
| 2004/0227752 | A1 | 11/2004 | McCartha et al. |
| 2005/0012757 | A1 | 1/2005 | Park et al. |
| 2005/0204306 | A1 | 9/2005 | Kawahara et al. |
| 2006/0061584 | A1 | 3/2006 | Kristiansen |
| 2006/0083440 | A1 | 4/2006 | Chen |
| 2006/0117259 | A1 | 6/2006 | Nam et al. |
| 2006/0266135 | A1 | 11/2006 | Nishikawa et al. |
| 2007/0003302 | A1 | 1/2007 | Mizes |
| 2007/0080967 | A1 | 4/2007 | Miller |
| 2008/0292360 | A1 | 11/2008 | Hirai |
| 2008/0307327 | A1 | 12/2008 | Newcomer et al. |
| 2009/0284527 | A1 | 11/2009 | Ofek et al. |
| 2010/0086721 | A1 | 4/2010 | Batchelder |
| 2010/0098316 | A1 | 4/2010 | Papaioannou |
| 2010/0157021 | A1 | 6/2010 | Abraham et al. |
| 2011/0194739 | A1 | 8/2011 | Vincent et al. |
| 2012/0054026 | A1 | 3/2012 | Robinson et al. |
| 2012/0062712 | A1 | 3/2012 | Kesseler et al. |
| 2012/0081357 | A1 | 4/2012 | Habbecke et al. |
| 2012/0139910 | A1 | 6/2012 | Lee et al. |
| 2012/0265647 | A1 | 10/2012 | Negrillo et al. |
| 2013/0029232 | A1 | 3/2013 | Tian et al. |
| 2013/0076619 | A1 | 3/2013 | Carr |
| 2013/0135305 | A1 | 5/2013 | Bystrov et al. |
| 2013/0241928 | A1 | 9/2013 | Brown et al. |
| 2013/0249906 | A1 | 9/2013 | Gunderson et al. |
| 2013/0271461 | A1 | 10/2013 | Baker |
| 2013/0286161 | A1 | 10/2013 | Lv et al. |
| 2014/0056510 | A1 | 2/2014 | Van Bree et al. |
| 2014/0067104 | A1 | 3/2014 | Osterhout |
| 2014/0100996 | A1 | 4/2014 | Klein et al. |
| 2014/0125654 | A1 | 5/2014 | Oh |
| 2014/0253547 | A1 | 9/2014 | Schmidt |
| 2014/0375633 | A1 | 12/2014 | Dillard et al. |
| 2015/0015480 | A1 | 1/2015 | Burr |
| 2015/0106241 | A1 | 4/2015 | Lucido |
| 2015/0134496 | A1 | 5/2015 | Grinblat et al. |
| 2015/0145966 | A1 | 5/2015 | Krieger et al. |
| 2015/0154806 | A1 | 6/2015 | Ogale |
| 2015/0178988 | A1 | 6/2015 | Mora et al. |
| 2015/0332216 | A1 | 11/2015 | Doshi et al. |
| 2015/0339853 | A1 | 11/2015 | Wolper et al. |
| 2015/0350737 | A1 | 12/2015 | Anderson |
| 2015/0379045 | A1 | 12/2015 | Zhang et al. |
| 2015/0381968 | A1 | 12/2015 | Arora et al. |
| 2016/0005169 | A1 | 1/2016 | Sela et al. |
| 2016/0005211 | A1 | 1/2016 | Sarkis et al. |
| 2016/0042556 | A1 | 2/2016 | Imber et al. |
| 2016/0070952 | A1 | 3/2016 | Kim et al. |
| 2016/0078687 | A1 | 3/2016 | Van et al. |
| 2016/0092645 | A1 | 3/2016 | Vlutters et al. |
| 2016/0098378 | A1 | 4/2016 | Griglak |
| 2016/0127682 | A1 | 5/2016 | Turbell |
| 2016/0212370 | A1 | 7/2016 | Lee et al. |
| 2016/0232375 | A1 | 8/2016 | Loeb et al. |
| 2016/0241892 | A1 | 8/2016 | Cole et al. |
| 2016/0253821 | A1 | 9/2016 | Romano et al. |
| 2016/0335712 | A1 | 11/2016 | Tapley et al. |
| 2016/0350618 | A1 | 12/2016 | Meekins et al. |
| 2017/0140574 | A1 | 5/2017 | Sugita et al. |
| 2017/0154461 | A1 | 6/2017 | Rhee |
| 2017/0156430 | A1 | 6/2017 | Karavaev |
| 2017/0157856 | A1 | 6/2017 | Pratt et al. |
| 2017/0212661 | A1 | 7/2017 | Ito et al. |
| 2017/0345216 | A1 | 11/2017 | Boyle et al. |
| 2017/0372527 | A1 | 12/2017 | Murali et al. |
| 2018/0005433 | A1 | 1/2018 | Kohler et al. |
| 2018/0075592 | A1 | 3/2018 | White et al. |
| 2018/0124378 | A1 | 5/2018 | Forutanpour et al. |
| 2018/0158230 | A1 | 6/2018 | Yan et al. |
| 2018/0176474 | A1 | 6/2018 | Blanco et al. |
| 2018/0225408 | A1 | 8/2018 | Ziolo et al. |
| 2018/0240243 | A1 | 8/2018 | Kim et al. |
| 2018/0260988 | A1 | 9/2018 | Huang et al. |
| 2018/0261001 | A1 | 9/2018 | Wang et al. |
| 2018/0373858 | A1 | 12/2018 | Farkash et al. |
| 2019/0066349 | A1 | 2/2019 | Huang et al. |
| 2019/0124322 | A1 | 4/2019 | Yang et al. |
| 2019/0287297 | A1 | 9/2019 | Abhiram et al. |
| 2019/0378341 | A1 | 12/2019 | Xie et al. |
| 2020/0034999 | A1 | 1/2020 | Van Heteren et al. |
| 2020/0035013 | A1 | 1/2020 | Yu et al. |
| 2020/0234489 | A1 | 7/2020 | Wang |
| 2021/0142577 | A1 | 5/2021 | Thomas et al. |
| 2021/0375036 | A1 | 12/2021 | Zhao |
| 2022/0068011 | A1 | 3/2022 | Wang et al. |

FOREIGN PATENT DOCUMENTS

| | | |
|---|---|---|
| CN | 103942388 | 7/2014 |
| CN | 104952106 | 9/2015 |
| CN | 105378792 | 3/2016 |
| CN | 105849773 | 8/2016 |
| CN | 103325141 | 11/2022 |
| JP | 2016040649 | 3/2016 |
| WO | WO-2007130122 | 11/2007 |
| WO | WO-2014191055 | 12/2012 |
| WO | WO-2015173173 | 11/2015 |
| WO | WO-2018164949 | 9/2018 |
| WO | WO-2019241228 | 12/2019 |

OTHER PUBLICATIONS

U.S. Appl. No. 15/709,997, , "Corrected Notice of Allowability", U.S. Appl. No. 15/709,997, filed Jan. 28, 2020, 2 pages.
U.S. Appl. No. 15/709,997, , "Final Office Action", U.S. Appl. No. 15/709,997, filed Aug. 12, 2019, 18 pages.
U.S. Appl. No. 15/709,997, , "First Action Interview—Office Action Summary", U.S. Appl. No. 15/709,997, filed Apr. 25, 2019, 7 pages.
U.S. Appl. No. 15/709,997, , "First Action Interview Pre-Interview

(56) References Cited

OTHER PUBLICATIONS

Communication", U.S. Appl. No. 15/709,997, filed Mar. 14, 2019, 8 pages.
U.S. Appl. No. 15/709,997, , "Notice of Allowance", U.S. Appl. No. 15/709,997, filed Oct. 24, 2019, 7 pages.
U.S. Appl. No. 16/006,263, , "Advisory Action", U.S. Appl. No. 16/006,263, filed Apr. 20, 2020, 4 pages.
U.S. Appl. No. 16/006,263, , "Final Office Action", U.S. Appl. No. 16/006,263, filed Jan. 28, 2020, 21 pages.
U.S. Appl. No. 16/006,263, , "Final Office Action", U.S. Appl. No. 16/006,263, filed Mar. 7, 2022, 21 pages.
U.S. Appl. No. 16/006,263, , "Final Office Action", U.S. Appl. No. 16/006,263, filed Jan. 11, 2023, 22 pages.
U.S. Appl. No. 16/006,263, , "Final Office Action", U.S. Appl. No. 16/006,263, filed Feb. 5, 2021, 22 pages.
U.S. Appl. No. 16/006,263, , "Non-Final Office Action", U.S. Appl. No. 16/006,263, filed Aug. 16, 2021, 20 pages.
U.S. Appl. No. 16/006,263, , "Non-Final Office Action", U.S. Appl. No. 16/006,263, filed Aug. 17, 2020, 20 pages.
U.S. Appl. No. 16/006,263, , "Non-Final Office Action", U.S. Appl. No. 16/006,263, filed Sep. 9, 2022, 21 pages.
U.S. Appl. No. 16/006,263, , "Non-Final Office Action", U.S. Appl. No. 16/006,263, filed Aug. 29, 2019, 22 pages.
U.S. Appl. No. 16/006,263, , "Notice of Allowance", U.S. Appl. No. 16/006,263, filed Mar. 29, 2023, 8 pages.
U.S. Appl. No. 16/776,547, , "Corrected Notice of Allowability", U.S. Appl. No. 16/776,547, filed Nov. 4, 2021, 2 pages.
U.S. Appl. No. 16/776,547, , "Corrected Notice of Allowability", U.S. Appl. No. 16/776,547, filed Nov. 24, 2021, 2 pages.
U.S. Appl. No. 16/776,547, , "Non-Final Office Action", U.S. Appl. No. 16/776,547, filed Sep. 1, 2020, 7 pages.
U.S. Appl. No. 16/776,547, , "Notice of Allowability", U.S. Appl. No. 16/776,547, filed Jul. 27, 2021, 3 pages.
U.S. Appl. No. 16/776,547, , "Notice of Allowance", U.S. Appl. No. 16/776,547, filed Jul. 14, 2021, 7 pages.
U.S. Appl. No. 16/776,547, , "Notice of Allowance", U.S. Appl. No. 16/776,547, filed Mar. 17, 2021, 8 pages.
U.S. Appl. No. 17/500,756, , "Non-Final Office Action", U.S. Appl. No. 17/500,756, filed Dec. 30, 2022, 8 pages.
U.S. Appl. No. 17/500,756, , "Notice of Allowance", U.S. Appl. No. 17/500,756, filed Apr. 5, 2023, 9 pages.
18764564.3, , "Communication Pursuant to Article 94(3) EPC", EU Application No. 18764564.3, Jan. 13, 2023, 5 pages.
18764564.3, , "Communication Pursuant To Article 94(3) EPC", EP Application No. 18764564.3, Aug. 12, 2021, 5 pages.
18764564.3, , "Extended European Search Report", EP Application No. 18764564.3, May 29, 2020, 15 pages.
18764564.3, , "Partial European Search Report", EP Application No. 18764564.3, Nov. 7, 2019, 13 pages.
201880023721.0, , "Foreign Office Action", CN Application No. 201880023721.0, Nov. 14, 2022, 9 pages.
201880023721.0, , "Notice of Decision to Grant", CN Application No. 201880023721.0, May 26, 2023, 4 pages.
Abdel-Hakim, Alaa E. et al., "CSIFT: a SIFT Descriptor with Color Invariant Characteristics", 2006 IEEE Computer Society Conference on Computer Vision and Pattern Recognition (CVPR'06) [retrieved Sep. 15, 2023]. Retrieved from the Internet <https://doi.org/10.1109/CVPR.2006.95>, Jun. 2006, 6 pages.
Bay, Herbert et al., "Speeded-Up Robust Features (SURF)", Computer Vision and Image Understanding, vol. 110, No. 3 [retrieved Sep. 15, 2023]. Retrieved from the Internet <https://doi.org/10.1016/j.cviu.2007.09.014>, Jun. 2008, 14 pages.
Blankenburg, Matthias et al., "Detection of Counterfeit by the Usage of Product Inherent Features", Procedia CIRP, vol. 26. Retrieved from the Internet <https://doi.org/10.1016/j.procir.2014.07.062>., Mar. 27, 2015, 6 pages.
Goesele, Michael et al., "Multi-View Stereo for Community Photo Collections", 2007 IEEE 11th International Conference on Computer Vision [retrieved Sep. 15, 2023]. Retrieved from the Internet <https://doi.org/10.1109/ICCV.2007.4408933>, Oct. 2007, 8 pages.
Kim, H et al., "Device-Based Decision-Making for Adaptation of Three-Dimensional Content", The Visual Computer 22.Retrieved from the Internet <https://doi.org/10.1007/s00371-006-0009-3>, Apr. 20, 2006, 14 pages.
Koch, et al., "Realistic 3-D scene modeling from uncalibrated image sequences", Image Processing, ICIP 99. Proceedings. 1999 International Conference On—Kobe, Japan Oct. 24-28, 1999, IEEE, Piscataway, NJ, USA, vol. 2, 24, Oct. 1999, 5 pages.
Koch, Reinhard et al., "Robust Calibration and 3D Geometric Modeling from Large Collections of Uncalibrated Images", In: Förstner, W., Buhmann, J.M., Faber, A., Faber, P. (eds) Mustererkennung 1999. Informatik aktuell. Springer, Berlin, Heidelberg. Retrieved from the Internet <https://doi.org/10.1007/978-3-642-60243-6_48>, Sep. 1999, 8 pages.
Le, et al., "3D Modeling and Adaptation for Virtual Heritage System", Advances in Visual Computing. ISVC 2005. Lecture Notes in Computer Science, vol. 3804. Springer, Berlin, Heidelberg. Retrieved from the Internet <https://doi.org/10.1007/11595755_70>, 2005, 8 pages.
Lowe, David G. , "Object Recognition from Local Scale-Invariant Features", Computer Vision, 1999. The Proceedings of the Seventh IEEE International Conference, Kerkyra, Greece [retrieved Jan. 19, 2022]. Retrieved from the Internet <http://people.eecs.berkeley.edu/~efros/courses/AP06/Papers/lowe-iccv-99.pdf>., Sep. 1999, 8 pages.
Pauly, Mark et al., "Example-Based 3D Scan Completion", Retrieved from the internet <<URL:https://infoscience.epfl.ch/record/149337/files/pauly_2005_EBS.pdf>>, Jan. 1, 2005, 10 pages.
PCT/US2018/020629, , "International Preliminary Report on Patentability", PCT Application No. PCT/US2018/020629, Sep. 19, 2019, 6 pages.
PCT/US2018/020629, , "International Search Report", PCT Application No. PCT/US2018/020629, May 15, 2018, 2 pages.
PCT/US2018/020629, , "International Written Opinion", PCT Application No. PCT/US2018/020629, May 15, 2018, 4 pages.
PCT/US2019/036523, , "International Preliminary Report on Patentability", PCT Application No. PCT/US2019/036523, Dec. 24, 2020, 11 pages.
PCT/US2019/036523, , "International Search Report", PCT Application No. PCT/US2019/036523, Oct. 2, 2019, 7 pages.
PCT/US2019/036523, , "International Written Opinion", PCT Application No. PCT/US2019/036523, Oct. 2, 2019, 10 pages.
Pollefeys, Marc et al., "Metric 3D Surface Reconstruction from Uncalibrated Image Sequences", Lecture Notes in Computer Science, vol. 1506. Springer, Berlin, Heidelberg. Retrieved from the Internet <https://doi.org/10.1007/3-540-49437-5_10>, Nov. 30, 1998, 16 pages.
Wikipedia, , "3D reconstruction from multiple images", XP055635489, Retrieved from the Internet: URL:https://en.wikipedia.org/w/index.php? title=3D_reconstruction_from_multiple_images&oldid=765885475 (retrieved on Oct. 24, 2019), Feb. 16, 2017, 7 pages.
Yu, et al., "A 3D Vision-Based Quality Inspection Study for Molded Part with Multiple Geometry Shapes", Advanced Materials Research, vol. 1039. Retrieved from the Internet < https://doi.org/10.4028/www.scientific.net/AMR.1039.529>, Oct. 2014, 9 pages.
18764564.3 , "Communication pursuant to Article 94(3) EPC received for European Patent Application No. 18764564.3, mailed on Feb. 15, 2024", Feb. 15, 2024, 7 pages.

RECONSTRUCTION OF 3D MODEL WITH IMMERSIVE EXPERIENCE

CROSS REFERENCE TO RELATED APPLICATION'S

This application is continuation of U.S. patent application Ser. No. 16/006,263, entitled "RECONSTRUCTION OF 3D MODEL WITH IMMERSIVE EXPERIENCE," filed Jun. 12, 2018, which is hereby incorporated herein by reference in its entirety.

RELATED APPLICATIONS

This application is related to U.S. Provisional Application No. 62/468,748, entitled "COMMERCIAL INTEGRATION OF 3D MODELS," filed Mar. 8, 2017, which is hereby incorporated herein by reference in its entirety.

TECHNICAL FIELD

Embodiments of the present disclosure relate generally to data processing and, more particularly, but not by way of limitation, to automatically generating, and interacting with, three-dimensional models of physical objects.

BACKGROUND

Network based systems can provide users remote access to physical objects that are supplied, or offered, by a set of distributed suppliers. These systems typically store text-based or image-based representations of these physical objects in one or more searchable databases. A user can query these databases for a particular item, and receive, in response to the query, a text-based or image-based representation of the physical item. There are situations where such text-based or image-based representations fail to provide sufficient information about an item to enable a user to a determine whether an offered item is a suitable match for a particular need. There are times, for example, when a user cannot determine whether an offered item, such as an appliance or an item of furniture, is a good fit for a particular space in their home. In these situations, a user may have to obtain, or investigate, a physical sample of the item to determine its suitability.

BRIEF DESCRIPTION OF THE DRAWINGS

Various ones of the appended drawings merely illustrate example embodiments of the present disclosure and cannot be considered as limiting its scope.

Figure 1:
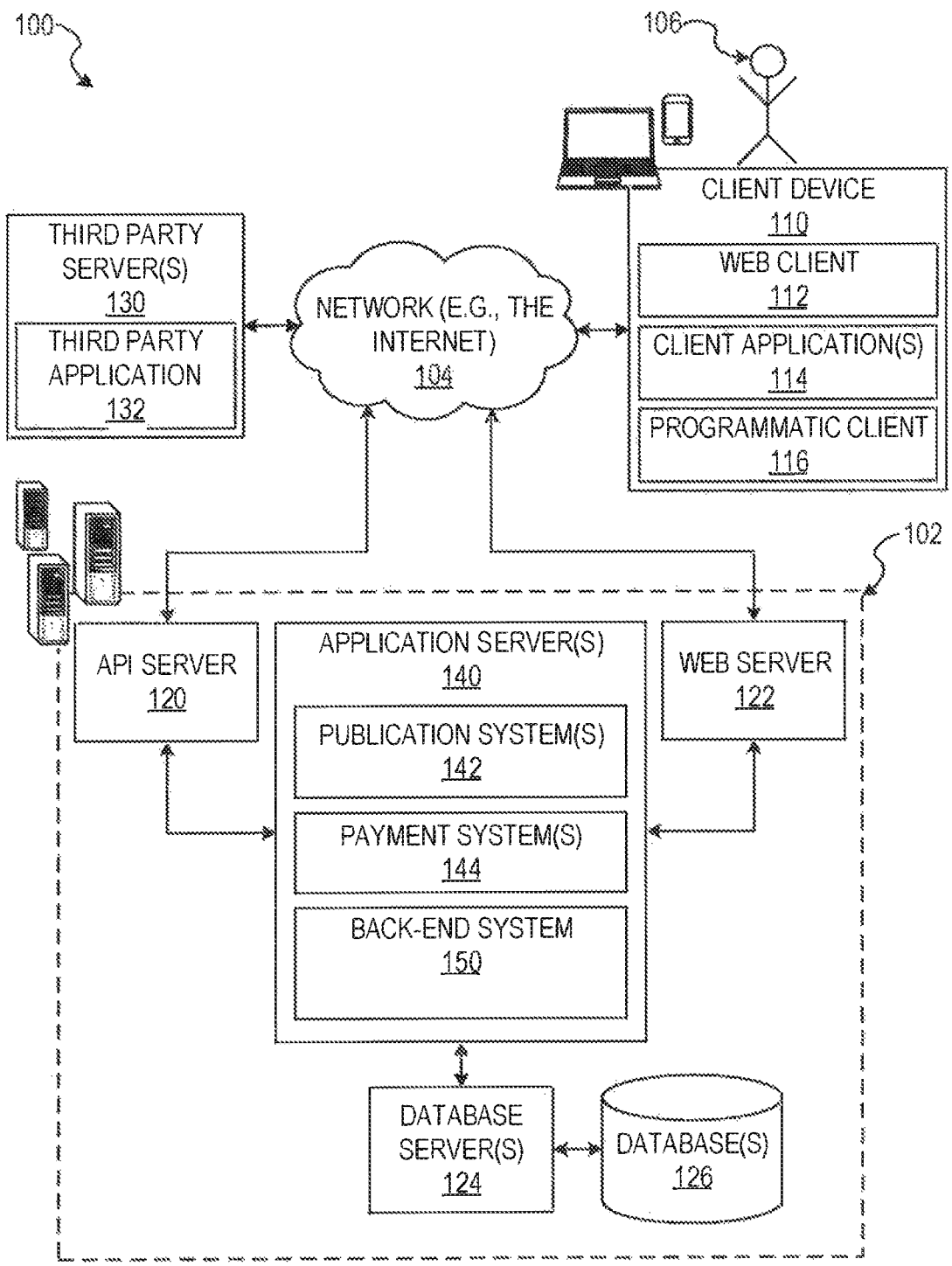
FIG. 1 is a block diagram illustrating an example of a network-based system for generating and interacting with a model of a physical object, according to various embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Capturing the appearance of an item (e.g., a physical object, such as an item offered for sale by a seller) in enough detail using text and graphical (e.g., image or video) descriptions to enable a user to determine whether the item is a suitable match for a particular user may be difficult. Additionally, presenting this information to a user in a manner that conveys enough detail about the item to enable a user to make an informed and reliable decision may be technically challenging. Such presentation may be enhanced by including rendering an interactive three-dimensional (3D) model of an item on a graphical user interface (GUI) of a device associated with a user. Typical techniques for generating a 3D model of an item, however, may require the skilled work of animators, expensive object scanning devices (e.g., a 3D scanner), or special cameras carefully arranged to capture images of the item at prescribed orientations. Additionally, a three-dimensional model generated according to these techniques may be generated without consideration to the capabilities of the specific user devices that may be used to render the 3D models, resulting in computationally inefficient, or slow, rendering on these devices. Some techniques may address this limitation by manually generating and storing a small set of one or more pre-rendered 3D models at varying resolutions.

The described techniques, however, may not be scalable to large network-based systems that may have to provide 3D realistic visual representations of a constantly changing stream of thousands of items to user devices that have disparate computational capabilities and resource limitations. Such items, for example, may be offered by a disparate set of geographically distributed suppliers having varying amounts technical abilities and resources, thus making it technologically or financially impractical to provide a network-based system with the inputs (e.g., skilled animators, scanning models, or skillfully captured images of the items) needed to generate realistic 3D models of these items. The described techniques may also require the storage of large amounts of data for the set of pre-rendered 3D models. Given storage and other resource limitations of certain user devices, it may not be possible, or practical, to generate pre-rendered 3D models to match specific characteristics of each user device that may be used to render these 3D models.

Embodiments of the present disclosure include techniques (e.g., systems, methods, and computer program products) to automatically generate a 3D model of an item from a set of two or more casually captured, such as by a user not possessing specialized equipment (e.g., a 3D scanner) or particular skills in photography, two-dimensional (2D) images of the item. Such a 3D model may be generated with enough geometric complexity to enable a detailed rendering, or presentation, of the 3D model on a disparate set of user devices. Such techniques may automatically generate optimized sampled 3D models of the item from the generated 3D model. The sampled 3D models may be optimized, such as by determining the geometric complexity of the sampled 3D models, based to one or more device characteristics of a user device used to render the sampled 3D models. Such optimization may provide 3D models having a size and complexity that matches the computational or resource capabilities of specific devices, such as to enable low latency retrieval and high fidelity rendering of these 3D models, such as in a 3D environment.

Embodiments of the present disclosure further include techniques for querying, rendering, manipulating, and otherwise interacting with locally rendered optimized 3D models of an item using both a standard graphical user interface (e.g., a graphical user interface of a desktop or hand-held computing device) and an immersive graphical user interface (e.g., a graphical user interface of a virtual reality or augmented reality device or system). Such techniques may include interacting with the immersive graphical user interface using gesture and visual focus controls.

According to various embodiments, a network-based system may include a back-end system and a front-end system. The back-end system may be configured to receive image data, such as 2D images and video, from suppliers offering or listing items on the network based system. The back-end system may be further configured to analyze the image data to determine attributes of the item, such as a three-dimensional geometry of the item and associated texture information, and to use the determined attributes to generate a high resolution geometric 3D model the item. The system may be additionally configured to generate, based on the 3D model, sampled models optimized based on device characteristics of user devices that may render the 3D models.

According to various embodiments, the frond-end system may include a user interface that renders 3D models in both a standard graphical user interface mode and an immersive graphical user interface mode. The front-end system may receive, from a back-end system, an optimized 3D model of an item, and may render the optimized 3D model using a local graphics processing circuit. The front-end system may include hardware components, such as optical and positioning sensors, to receive input from a user to control or interact with the immersive graphical user interface.

As used herein, a 3D model of object, such as an item or a product offered for sale by a seller, may include geometric data representing a 3D shape of the object. Such geometric data may include a set of 3D points, such as points in a 3D Cartesian coordinate system. Subsets of the set of 3D points may represent regular geometric shapes (e.g., geometric primitives), such as a triangle or other polygon, representing a plane or other facet of a 3D surface of the object. Two or more of these regular shapes may be coupled together to define the 3D surface representation of the object, such as a mesh or polygon based 3D model. A complexity or size of a 3D model of an object may be associated with the number of 3D points included in the geometric data representing the 3D surface of the object. Such complexity may also be associated with the quantity or size of the of the geometric primitives defining the 3D surface representation of the object.

With reference to FIG. 1, an example embodiment of a high-level client-server-based network architecture 100, such as a network-based system 102 for generating and interacting with a model of an item, is shown. The networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), an application 114, and a programmatic client 116 executing on client device 110.

The client device 110 may comprise, but are not limited to, a mobile phone, desktop computer, laptop, smart phones, tablets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, virtual or augmented reality headsets, accelerometers, gyroscopes, cameras, microphones, global positioning system (GPS) devices, physical positioning sensors (e.g., sensors for determining a physical user gesture, such as pointing at an object), 3D graphics processing devices (e.g., a graphics processor, co-processor, or accelerator), and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. In some embodiments, the network-based market place may be rendered as a 3D environment where the product listings include renderings of optimized 3D models of the products offered in the network-based marketplace. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102. The e-commerce site application or the web browser may be configured to query, render, and interact with 3D models of items or products, as described herein.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third-party application 132, executing on third party server(s) 130, is shown as having programmatic access to the networked system 102 via the programmatic interface provided by the API server 120. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The back-end system 150 may provide functionality operable to perform various graphical processing and optimization operations. For example, the back-end system 150 may receive device characteristics data of the client device 110 and image data associated with an item from the client device, the databases 126, the third-patty servers 130, the publication system 142, and other sources. In some example embodiments, the back-end system 150 may analyze the device characteristics data and image data to generate and provide optimized 3D models of items. In some example embodiments, the back-end system 150 may communicate with the publication systems 142 (e.g., accessing item listings) and payment system 122. In an alternative embodiment, the personalization system 150 may be a part of the publication system 142. In some embodiments components of the publication system 142 may be included in a front-end system disposed on the client device 110, as described herein.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Additionally, a third-party application(s) 128, executing on a third-party server(s) 130, is shown as having programmatic access to the networked system 102 via the programmatic interface provided by the API server 114. For example, the third-party application 128, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
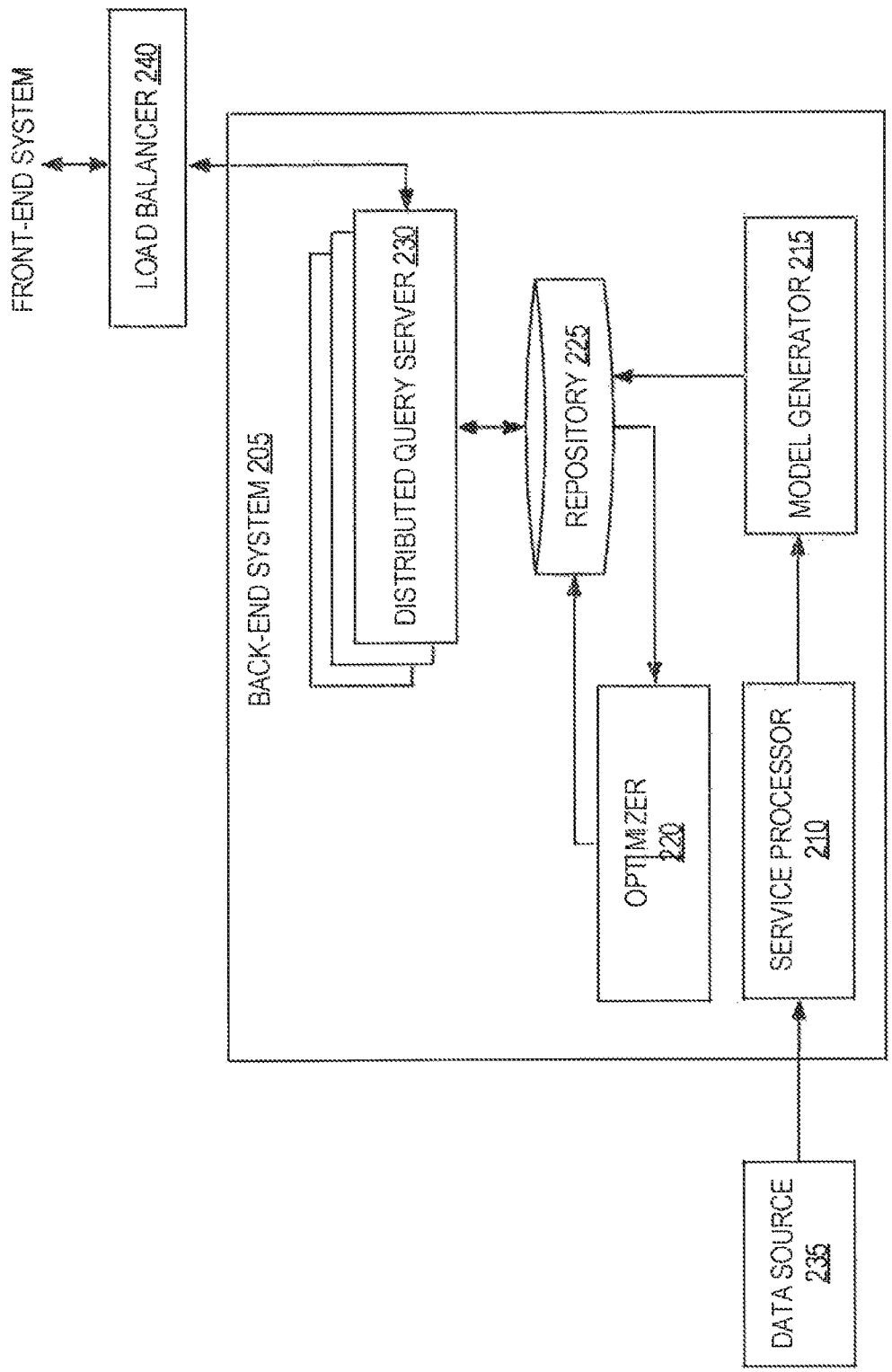
FIG. 2 is a diagram of an example of a back-end system that is associated with a network-based system for generating, and interacting with, a three-dimensional model of an item, according to various embodiments.

FIG. 2 is a diagram of an example of a back-end system 205 that is associated with a networked-based system for generating, and interacting with, a model of a physical object, according to various embodiments. The back-end system 205 may be an embodiment of the back-end system 150, as shown in FIG. 1. The back-end system 205 may include one or more hardware circuits (e.g., accelerators, signal processors, microprocessors, and storage devices) and one or more software components (e.g., applications, scripts, modules, and other computer executable code) to receive user device characteristic data and image data, and to automatically generate an optimized 3D model of an item, such as for rendering on a diverse set of client devices 110, while reserving fidelity to the details of features or attributes of the items. The back-end system 205 may include a service processor 210, a model generator 215, a repository 225, an optimizer 220, and a distributed query server 230. In some embodiments, the back-end system 205 may also include a data source 235, and a load balancer 240. The components of the back-end system 205 may communicate with each other, and with other systems, using one or more network (e.g., using a network interface card, or other communication bus) or inter-process communication techniques (e.g., shared memory, or software sockets). The back-end system 205 may include a distributed internet service, such as cloud based distributed web service, provided by one or more computing systems and associated software applications configured to process large amounts of image or video data to generate optimized 3D models of items, as described herein.

The service processor 210 may include hardware circuits and software components to receive image data (e.g., images, videos, and other multimedia resources) transmitted to the back-end system 205 by one or more client devices 110. Such image data may include files or other data structures having digital images or videos capturing an item (e.g., an automobile, a piece of furniture, an appliance, or other item offered for sale) from two or more orientations (e.g., physical angles, perspectives, or points of views). In some embodiments, such image data may show characteristics or attributes (e.g., features such as color, condition, age, texture, etc.) of the item. Such files may be stored in a local repository, such as the database 126 (FIG. 1) or in a remote storage system, such as a cloud based persistent storage. In some embodiments, the service processor 210 may initiate, and track the progress of, one or more 3D model construction jobs (e.g., tasks or processes), such as a process executed by model generator 215. Such jobs may be initiated in response to receiving image data associated with a new item. Such jobs may also be initiated in response to a processor, such as hardware processing circuit, of the model generator 215 requesting image data to initiate a new 3D model construction job, such as in response to the processor having capacity to initiate a new job.

The model generator 215 may include one or more processors configured, such as by one or more hardware circuits or software components, to execute a 3D model construction algorithm to construct a 3D model of an item using image data received from the service processor 210, or from a repository or remote storage system associated with the service processor. In some embodiments, the reconstruction algorithm may include generating a 3D model of an item using a stored 3D model of a product (e.g., a general version or genus of items, of which the item is a specimen) associated with the item. In these embodiments, a real world item (or product) may be converted to a 3D model of the item, such as by mapping or associating texture data extracted from the image data to the 3D model of the product. This may include mapping or associating texture data to specific geometric data or geometric shapes defining the surface of a 3D model of a product. In other embodiments, the model generator 215 may analyze the image data to determine 3D geometric data, such as a set of 3D points extracted from the relative capture orientation of the two or more images of an item, for generating a mesh or polygon based 3D model of an item. The model generator 215 may also analyze the image data to extract texture data, or other data indicating characteristics or features of the item, corresponding to the determined 3D geometric data. In some embodiments, a generated 3D model of an item may be rendered by a client device 110 by removing hidden surfaces, or geometric data representing surfaces hidden by other visible surfaces, and mapping texture data to remaining visible surfaces of the 3D model.

The model generator 215 may generate a high-resolution 3D model of an item along with texture data associated with the models. In some embodiments, the 3D model and associated texture data may be encoded and compressed in one or more data structures. Such data structures may be stored in a repository 225, such as a local data store or a remote cloud based storage system.

The repository 225 may include a local storage device such as one or more hard disk drives, solid state drives, or other persistent storage device. The repository 225 may also include remote cloud based storage systems coupled to the model generator 215 through a data communication network. In various embodiments, the repository 225 may store high resolution 3D models and associated texture data received from the model generator 215. The 3D models and associated texture data may be stored in one or more databases associated with, or included, in the repository 225. In some embodiments, a 3D model of an item and the associated texture data may be indexable, such as by using an identifier of the item, or by using other descriptive text associated with the item.

The optimizer 220 may include one or more hardware circuits or software components configured to automatically optimize the geometry (e.g., the geometry data) of a high-resolution 3D model generated by the model generator 215. Such optimization may include sampling the high-resolution 3D model to generate lower resolution sampled 3D models based on, for example, computing (e.g., processor power, and device storage and memory) and communication resources (e.g., data communication bandwidth) of client devices 110 that may render the sampled 3D models. Such sampling may include removing redundant geometric primitives from the high-resolution 3D model while preserving a desired amount of visual and aesthetic quality of the model (e.g., the quality of the look and feel of the model), such as by preserving the boundaries (e.g., separation or distinction between different projections or appendages of the model) and the topology (e.g., the 3D surface contours) of the 3D model. Such sampling may reduce the amount of memory required to store 3D models, such as by reducing the amount of geometric data required to store different models adapted to render on specific client devices. In some embodiments, two or more sampled 3D models may be associated with a single set of texture data, further reducing the storage requirement for the sampled models (e.g., by not duplicating stored textured data). In certain embodiments, a sampled 3D model may be dynamically generated, such as in response to a request for a 3D model of an item received from a specific client device, further reducing storage requirements for the sampled models. In these embodiments, for example, the back-end system 205 may store geometric data of a high-resolution 3D model, texture data associated with the high-resolution 3D model, and one or more sampling parameters tier generating one or more sampled models based on the high-resolution 3D model. Such sampling may also reduce the amount of data transferred to a client device in response to a request for a 3D model of an item, thereby reducing the communication bandwidth needed to interface a client device 110 to the network based system 102. Such sampling may also reduce the amount of processing required to render a 3D model of an item on a client device 110, which may increase the frame rate for displaying a rendered 3D model in, for example, an immersive 3D environment (e.g., a virtual reality or augmented reality environment).

According to various embodiments, the optimizer 220 may receive a high resolution (e.g., high complexity) 3D model of an item, such as from the repository 225. The optimizer 220 may also receive one or more input parameters for configuring a computational geometry algorithm to simplify or sample, such as by using color and texture attributes under a quadratic error constraint, geometric data of the received high resolution 3D model. The one or more input parameters may be derived from one or more device characteristics of a client computing device, such as processing power, memory capacity, and data communication bandwidth. The device characteristics may be received from a client device 110, such as in association with a request for a 3D model of an item, or based on a stored configuration of a user device. In some embodiments, one or more of the input parameters may be specified by a user of the client device 110. The one or more input parameters may include a desired number of geometric primitives (e.g., to determine a number of triangles, an amount of geometric data, or a complexity of a sampled 3D model), a threshold quality level (e.g., a threshold rendering frame rate or resolution), and indicator of whether to preserve boundaries and topology in the sampled 3D model. In some embodiments, a desired number of geometric primitives may include a threshold number of triangles in a geometric mesh 3D model. The threshold number of triangles may be a maximum number of triangles used to generate a geometric mesh 3D model, such as to limit the size of the model. The threshold number of triangles may also be a minimum number of triangles used to generate a geometric mesh 3D model, such as to cause the model to have a desired resolution.

The optimizer 220 may generate two or more versions of sampled 3D models for an item, such that each version has a different resolution. Each version of the sampled 3D models may represent tradeoffs between data storage, network system response to a request for a 3D model of an item, rendering time or frame rate, and 3D model data size. Accordingly, the optimizer may be adaptable, such as by configuring the computational geometry algorithm using the one or more input parameters, to different data communication network bandwidths, and client device 110 processing power or resource availability. As an example, low resolution sampled models may be generated for client devices 110 that have limited (e.g., low) data communication network bandwidth or low processing power.

In some embodiments, the optimizer 220 may generate one or more sampled 3D models for each high-resolution 3D model of an item stored in the repository 225 using one or more sets of device characteristics for client devices 110 known to, or previously registered with, the network-based system 102. In other embodiments, the optimizer 220 may dynamically generate a sampled 3D model, such as in response to the system 102 receiving a request to for a 3D model from a client device 110 that was not previously known to the network-based system 102.

The sampled 3D models may be stored in repository 225. In some embodiments, a sampled model may be indexable according to an indicator of other descriptor of an item and according to one or more device characteristics of a client device 110.

The distributed gum, server 230 may include one or more hardware circuits or software components configured to receive queries or requests, such as from one or more client devices 110, for a 3D model of an item. Such queries may be received or serviced by one or more distributed computing system or component of the network-based system 102. In some embodiments, the distributed query server 230 may receive a query from a client device 110 through load balancer 240. The distributed query server 230 may process the request to retrieve, from the repository 225 or from the optimizer 200, a requested 3D model. Such processing may include converting the received query into suitable structure or format, such as a structured query language statement, for searching the repository 225. In some embodiments, the distributed query server 230 may receive a 3D model and associated texture data in one or more data structures from the repository 225. The distributed query server 230 may transmit the one or more data structures to a client device 110 from which the 3D model request was received.

The load balancer 240 may include one or more hardware circuits or software components to balance the processing or communication load on the network system 102 by allocating received queries or service request to one or more distributed query servers 230, such as according a workload on the each of the one or more distributed query servers 30.

The data source 235 may include any computing device or data store configured to transmit image data of an item to the service processor 210. The data source 235 may include a client device 110, configured to transmit one or more pictures or videos of an object to the network system 102. In some embodiments, the data source 235 may also be a repository, such as a database or a cloud storage system.

Figure 3:
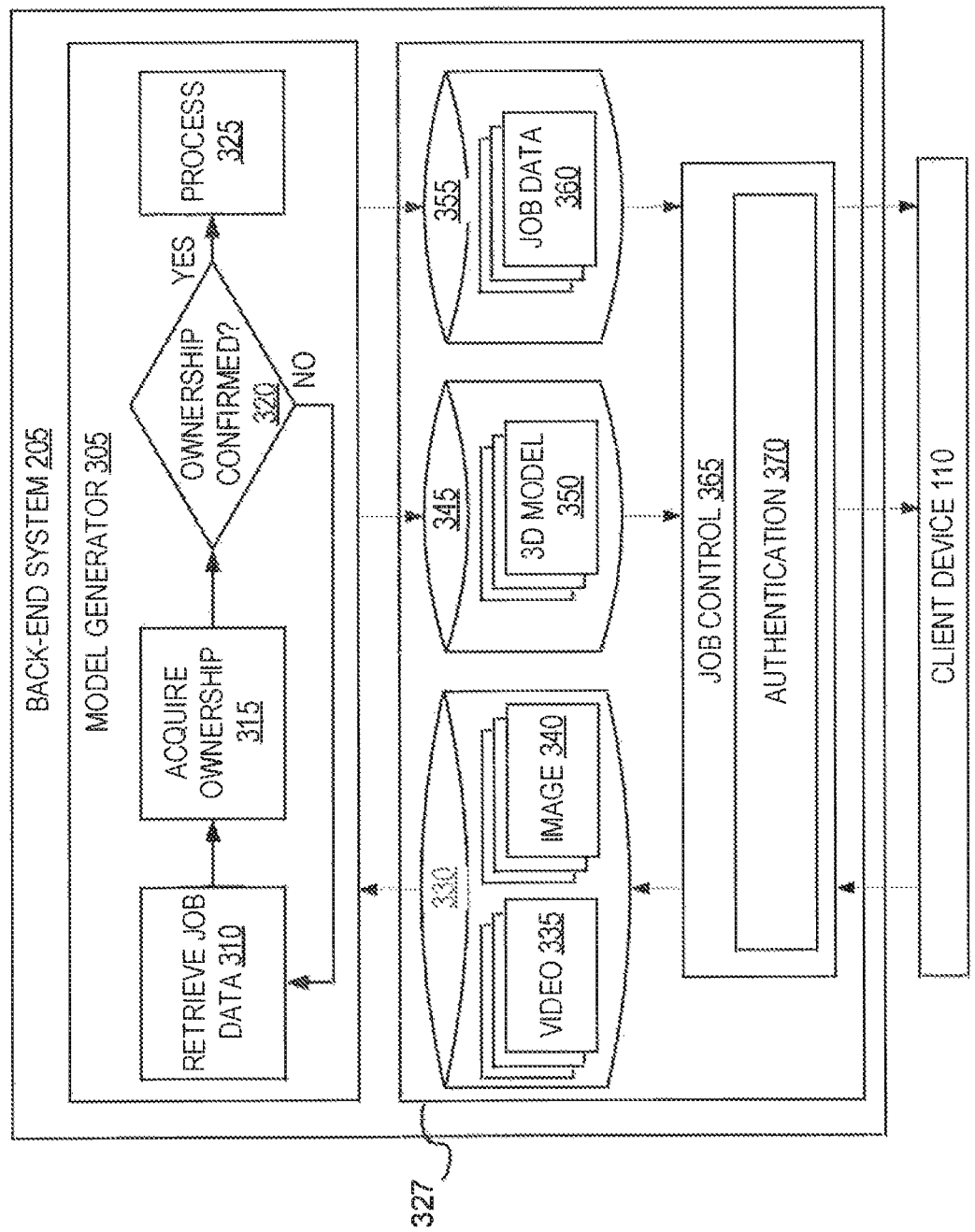
FIG. 3 is a diagram of an example of components of a service processor and a model generator of a back-end system, according to various embodiments, according to various embodiments.

FIG. 3 is a diagram of an example of components of service processor 327 and a model generator 305 of a back-end system 205, according to various embodiments. The service processor 327 can be an example of the service processor 210 (Ha 2), while the model generator 305 may be an example of the model generator 215 (FIG. 2). In some embodiments, back-end system 305 may be part of a network-based system, such as the network system 102 (FIG. 1).

The service process 327 may include an image data repository 330, a 3D model repository 345, and a job data repository 355, and a job control component 365. In some embodiments, one or more of the image data repository 330, the 3D model repository 345, and the job data repository 355 may be a database or data store external to the service processor 327, such as the repository 225 (FIG. 2). Image data repository 330 may store digital video 335 and digital images 340 of one or more items offered by a seller. The 3D model repository 345 may' store one or more 3D models 350, such as high-resolution 3D model, of an item generated by model generator 305. In some embodiments, the 3D model repository 345 may also store one or more sampled 3D models, such as a sampled 3D model generated by optimizer 220 (FIG. 2). The job data repository 355 may store job status information 360 for one or more 3D model generation jobs initiated or executed by the model generator 305. Such job status information 360 may indicate a current status of a job, as processor executing the job, and information associated with job.

The job control component 365 may include one or more hardware circuits or software components for controlling interactions with, and operations within, the service processor 327. For example, the job control component 365 may include an authentication component 370, such as to restrict access to the image data repository 330, the 3D model repository 345, and the job data repository 355 to authorized client devices 110, such as client devices associated with sellers having established accounts on the network-based system 102. In some embodiments, the job control component 365 may interface with client device 110 to receive image data from the client device. In certain embodiments, the job control component 365 may process a request to provide 3D models and job status information, such as from 3D model repository 345 and job data repository 355, in response to a request from an authorized client device 110. The job control component 365 may also coordinate the distribution of 3D model generation jobs or tasks to the model generator 305 (e.g., to one or more processors associated with the model generator 305). As an example, the model generator 305 may include one or more processors configured to access image data from the service processor 327. Each of the one or more processors may be associated with one or more hardware circuits or software components to execute a synchronization process to ensure that a given processor has ownership of a 3D model generation job before the processor execute or processes the job, such as to prevent two or more processors from wasting resources by erroneously duplicating work on the same job. The process, at 310, may include retrieving new job data from the job control component 365. Such new job data may include an indicator or identifier of unprocessed image data stored in the image data repository 330. The process, at 315, may then include acquiring, or requesting, ownership of the job associated with the new job data. The job control 365 component may allocate the job to the requesting processor in response to determining that the job was not previously allocated to another processor. The process, at 320, may include confirming ownership for the job. The process may be continued at 310 when ownership is not confirmed, while the process may be continued at 325 when ownership is confirmed. The process, at 325, may include executing or processing the 3D model generation job, such as to generate a 3D model of an item. The generated 3D model may then be stored in the 3D model repository 345. In some embodiments, the process may include providing job status update at each step in the control component 365.

Figure 4:
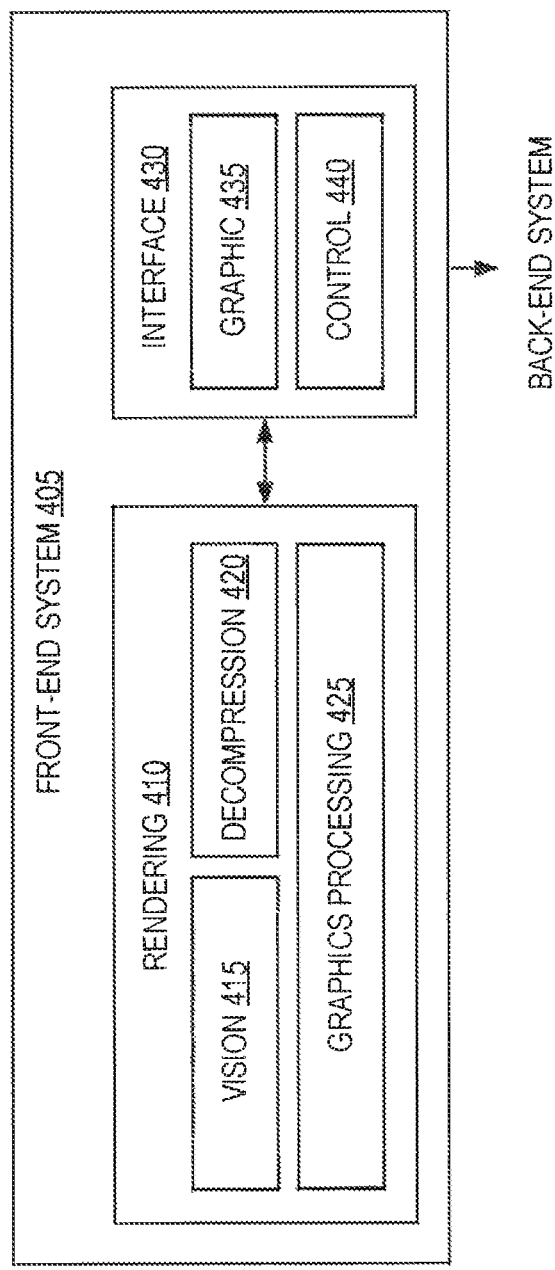
FIG. 4 is a diagram of an example of a front-end system that is associated with a network-based system for generating, and interacting with, a three-dimensional model of an item, according to various embodiments.

FIG. 4 is a diagram of an example of a front-end system 405 that is associated with a network based system 102 for generating, and interacting with, a 3D model of an item, according to various embodiments. The front-end system 405 may include one or more hardware circuits or software components of a client computing system, such as client device 110 (FIG. 1). Such hardware circuits or software components may be configured to generate realistic visualizations of 3D models of items. Such visualizations may include rendering a 3D model at a desired frame rate on a selected graphical user interface, such as on a web browser or on an immersive graphical user interface device, such as a virtual reality headset or an augmented reality visualization or overlay device. The 3D models may be received in response to the front-end system 405 transmitting a request to a network-based system 102, such as to a back-end system 205 of the network-based system 102, for a 3D model of an item. Such request may include device characteristics of the client device 110 hosting the front-end system 405, such as to enable the network-based system 102 to respond to the request by transmitting a 3D model that is optimized for the client device. As used herein, a 3D model may be optimized for a client device when the 3D model improved, with respect to an un-optimized model, to reduce the computational resources used by the client device to process the 3D model. In some embodiments, the front-end system 405 receives an automatically generated 3D model of an item from, for example, the back-end computing system 205, renders the 3D model on a web browser or other graphic user interface of a client device 110, and transforms and updates the 3D model and the rendering of the 3D model in response to user inputs, such as requests or commands to rotate, translate, and resize the 3D model. The front-end system. 405 may include a rendering component 410 and an interface component 430.

Rendering component 410 may include one or more hardware circuits or software components to render an automatically generated 3D model of an item. Such hardware circuits or software components may include a vision component 415, a decompression component 420, and a graphics processing component 425.

The vision component 415 may generate a stereoscopic rendering of a 3D model for display in an immersive graphical user interface device, so as so generate a sense of 3D depth when the 3D model is viewed using and immersive graphical user interface device. In some embodiments, the stereoscopic rendering of the 3D model may be generated by receiving a first rendered image of the 3D model having a first orientation (e.g., a viewing angle) and transforming the first rendered image to generate a second rendered image having a second orientation, wherein the second orientation is an offset of the first orientation. In some embodiments, the stereoscopic rendering of the 3D model may be generated by causing the rendering component 410 to generate a first rendered image of the 3D model at a first orientation, transforming the 3D model to cause the 3D model to have a second orientation, and then causing the rendering component to generate a second rendered image of the 3D model at the second orientation. Such first and second orientations may be selected to determine a perceived 3D depth of the stereoscopic rendering of the 3D model. Generating the stereoscopic rendering may further include providing the first rendered image and the second rendered image to the immersive graphical user interface device.

The decompression component 420 may decompress a compressed 3D model received on a network-based system 102, such as by using one or more data decompression algorithms, one or more data decompression circuits (e.g., a compression/decompression co-processor or accelerator) of the host computing system (e.g., the client device 110). The decompressed 3D model may be provided to vision component 415 and graphics processing component 425 for further processing.

The graphics processing component 425 may include one or more software components to interface with one or more graphics processing circuit (e.g., a graphics processing unit) of the client computing system 110, such as to use the graphics processing circuit to render (e.g., to generate one or more rendered images) a 3D model of an item. Such one or more software components may include a graphics processing application programming interface (API), such a WebGL API (WebGL is a trademark of the Khronos Group Incorporated). Such API may provide low computational overhead access to the one or more graphics processing circuits of the client computing system 110, such as to enable the graphics processing component 425 to generate renderings of complex 3D models (e.g., 3D models having a larger number of geometric primitives) at high frame rates. In some embodiments one or more software components may enable graphics processing component 425 to write a rendered frame or image directly to a framebuffer of the client device 110, so as to further improve rendering speed or frame rates.

The graphics processing component 425 may also include one or more software components to transform (e.g., rotate, translate, and resize) a 3D model of an item, such as in response to input for a user of the client device 110. Transforming a 3D model may include executing one or more operations (e.g., mathematical operations) on the geometric data associated with a 3D model to modify an appearance of the 3D model. In some embodiments, such transforming may include transferring the geometric data to the one or more graphics processing circuit, such as through an API, along with instructions for executing the desired transformation. After the transforming, the transformed 3D model may then be rendered, as previously described. 100591 interface component 430 may include a user interface to the client device 110. The user interface may include a graphics component 435 and a control component 440. The graphics component 435 may include a graphical user interface that is adaptable to display, and to enable a user to interact with, a rendered 3D model of an item through a standard graphical user interface, such as through a web browser, and through an immersive graphical user interface device, such as through a VR headset or and augmented reality visualization device.

The control component 440 may include one or more hardware circuits or software components to enable a user to interact with the front-end system 405, such as by requesting a 3D model of an item from the network-based system 102, and manipulating or interacting with a rendering of the 3D model. For standard graphic user interfaces, such one or more hardware circuits may include a character input device, such as keyboard, and pointer device, such as a mouse. For immersive graphical user interfaces, such hardware circuits may include a digital camera, an optical sensor, a tactile sensor, a positional sensor, and other input device. In an immersive 3D environment rendered by an immersive graphical user interface, a digital camera or other optical sensor may track a visual focus of a user to determine a user input, while an optical sensor, a tactile sensor, or positional sensor may track or identify a gesture of a user, such as pointing at a virtual object, to determine a user input.

Figure 5:
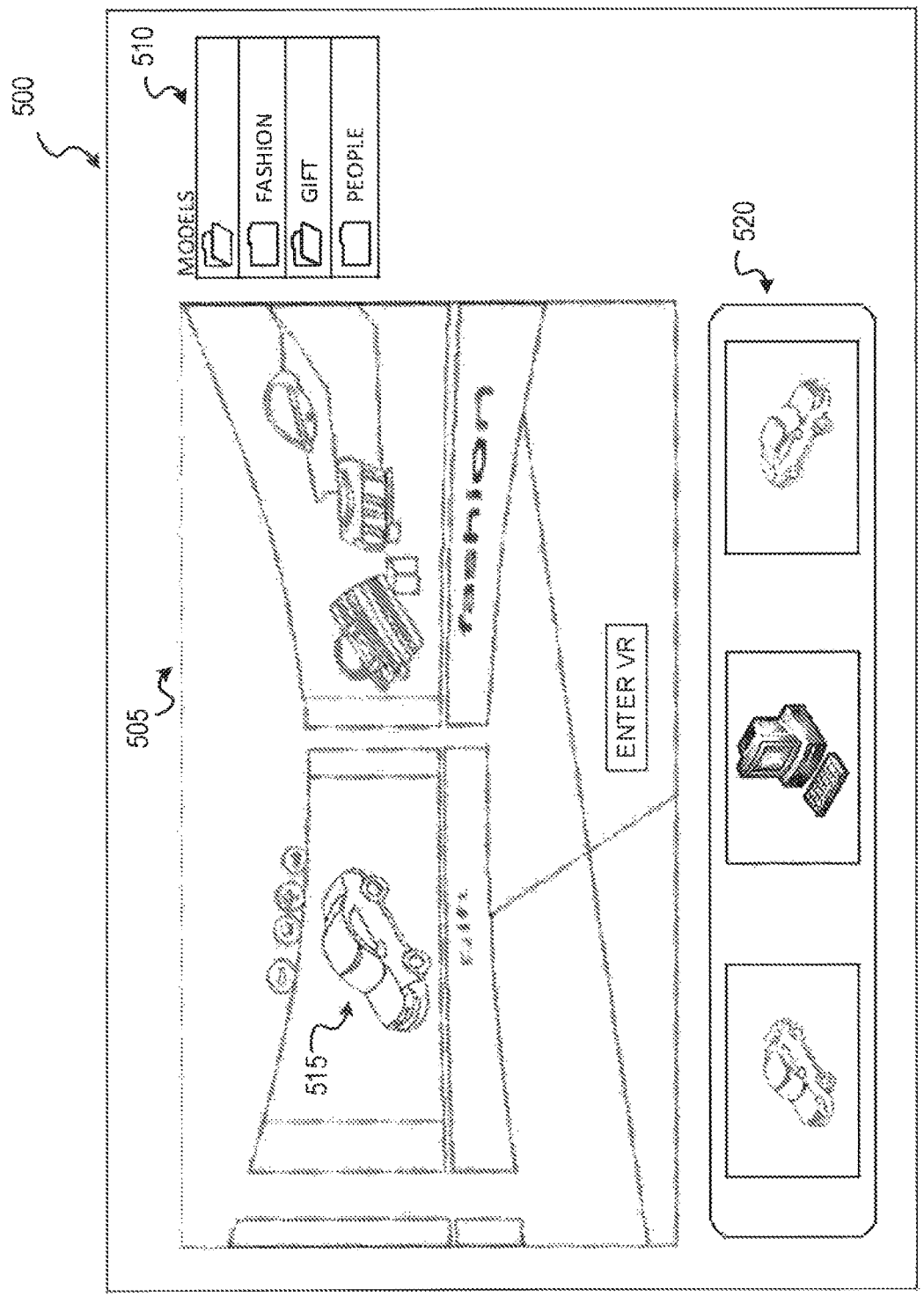
FIG. 5 illustrates an example graphical user interface to a front-end that is associated with a network-based system for generating, and interacting with, a three-dimensional model of an item, according to various embodiments.

FIG. 5 illustrates an example graphical user interface 500 of a front-end system that is associated with a network-based system for generating, and interacting with, a three-dimensional model of an item. Such front-end system may be configured to render and interact with automatically generated 3D models of items. The graphical user interface 500 may be an example of the interface 430 (FIG. 4), configured to display a rendered 3D model of an item in, for example, a standard graphics user interface (e.g., such as a web browser) of on a user device 110. The graphical user interface 500 may include a display area 505, a control area 510, and a catalog area 520. A user may request to browse a category of items by selecting (e.g., clicking using a pointer device) a node in the folder tree shown in the control area 510. This may cause a set of one or more image thumbnails of available 3D models corresponding to items associated with the selected nodes (e.g., a selected category) to be retrieved, such as from the back-end system 205, and displayed the catalog area 520. The user may then request a 3D model of an item by selecting the image thumbnail of the item from the catalog area. This may cause the front-end system 405 to retrieve the 3D model from the back-end system 205 (e.g., from the repository 225). The front-end system 405 may then process the retrieved 3D model to generate one or more renderings of the 3D model. The front-end system may then display the one or more renderings 515 in the display area 505.

Figure 6:
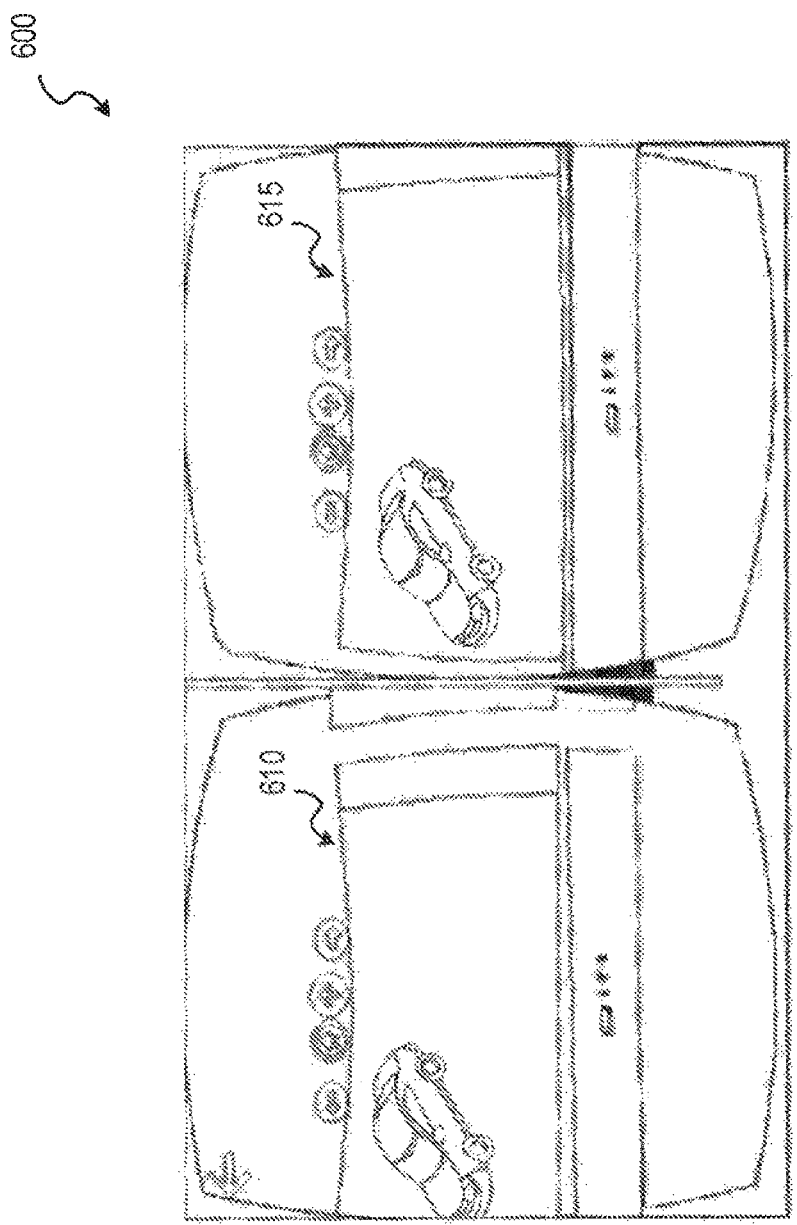
FIG. 6 illustrates an example immersive graphical user interface to a front-end of a system for generating and interacting with a model of a physical object, according to various embodiments.

FIG. 6 illustrates an example immersive graphical user interface 600 of a front-end system that is associated with a network-based system for generating, and interacting with, a three-dimensional model of an item. The immersive graphical user interface 500 may be an example of the interface 430 (FIG. 4), configured to display a rendered 3D model of an item in, for example, an immersive 3D environment. In some embodiments, a user may cause the front-end system 405 to transition the graphical user interface 500 to the immersive graphical user interface 600 using a control associated with the graphical user interface 500, such as the "ENTER VR" control. The immersive graphical user interface 600 may generate a binocular or stereoscopic view of rendered 3D model of an item by displaying a first rendering of the 3D model in a first display area 610 configured to be viewed by a first eye of a user, and displaying a second rendering of the 3D model in a second display area 615 configured to be viewed by a second eye of a user. The user may use a mouse, gesture controls, or other input techniques to interaction with, or manipulate, the rendered 3D model, such as by transforming the rendered 3D model by rotating, scaling or resizing, and translating the rendered model.

Figure 7:
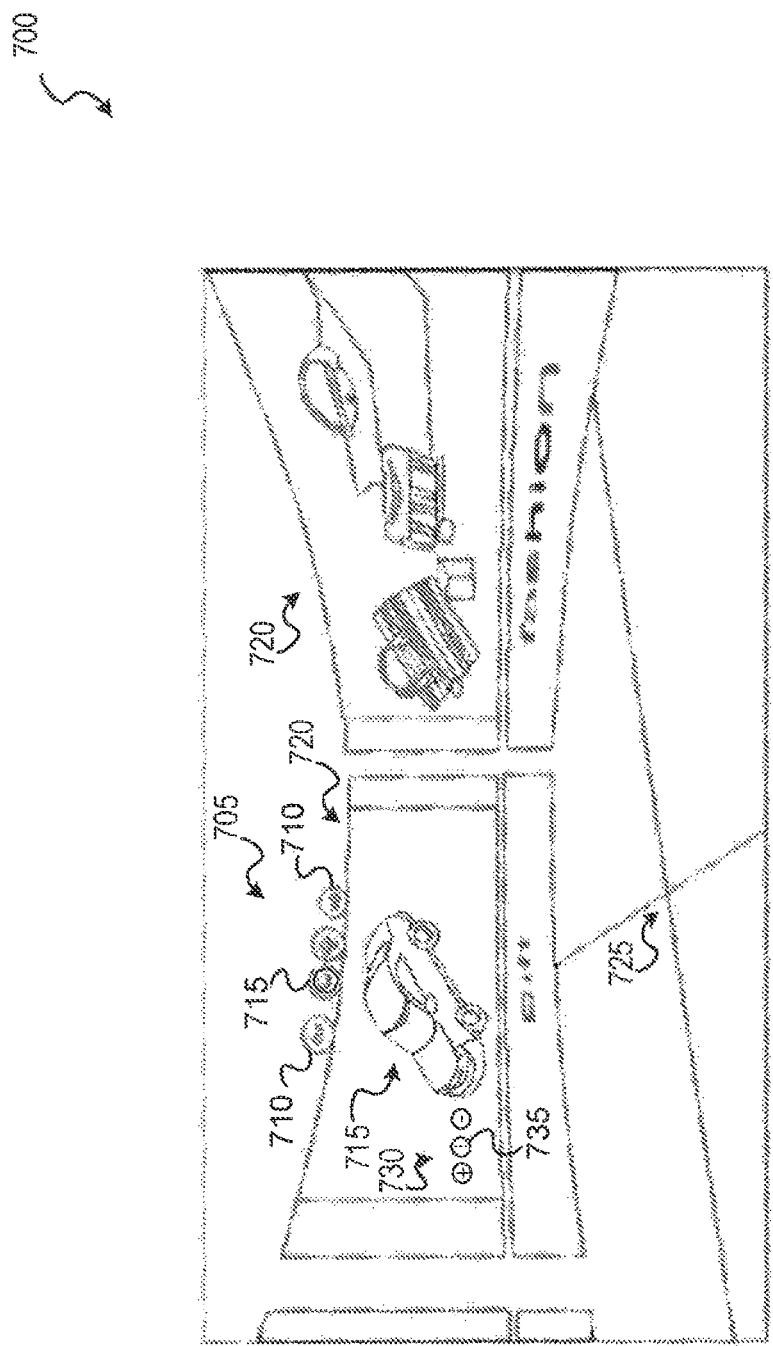
FIG. 7 depicts an example of a view of an immersive three-dimensional environment as viewed by a user through an immersive graphical user interface, according to various embodiments.

FIG. 7 depicts an example of a view of an immersive 3D environment 700 as viewed by a user through an immersive graphical user interface, according to various embodiments. In some embodiments, the view of the immersive 3D environment 700 may be a user perception of the environment rendered by the immersive graphical user interface 600. The immersive graphical user interface may enable a user to navigate and view information in the immersive 3D environment 700 without using any character input device (e.g., a keyboard) or a pointing device (e.g., a computer mouse). In some embodiments, a user may be located in an area 725 in the immersive 3D environment surrounding by large virtual display screens 720 (e.g., display areas). The controls 705 may be a set of navigation controls, such as to enable a user to navigate between rendered 3D models in a selected category. The control 710, for example, may enable as user to advance to the next 3D model, while the "home" control 715 may enable a user to return a first 3D model in a selected category or to a home menu. The display screens 720 may display renderings of 3D objects, as described herein. Each display screen 720 may also operate as interactive menu for retrieving information about an item associated with the rendered 3D model displayed on the display screen. A user may cause an action to be taken, or an object or control to be selected, by pointing to an object and visually focusing on the object, such as for a threshold time period, in the immersive 3D environment 700. Optical and positional sensors may detect the focus of the user and the pointing gesture. This information may be proved to, for example, control component 440 to be translated into an actionable user command. As an example, a user may select the "home" control 715 by point to, and visually focusing on the "home" control.

In some embodiments, a 3D model rendered on the display screens 720 may be associated with an information user interface. The information user interface may be initially hidden from the display screen 720. A user may cause the information user interface to be displayed by visually focusing on one or more symbols 730 associated with a control of the information user interface. As an example, a user may visually focus on an exclamation mark 735 to cause the information user interface to display the price, brand, and a short description of the currently displayed 3D model. The user may the cause the information menu to return to a hidden state by removing their focus from the exclamation mark 735.

Figure 8:
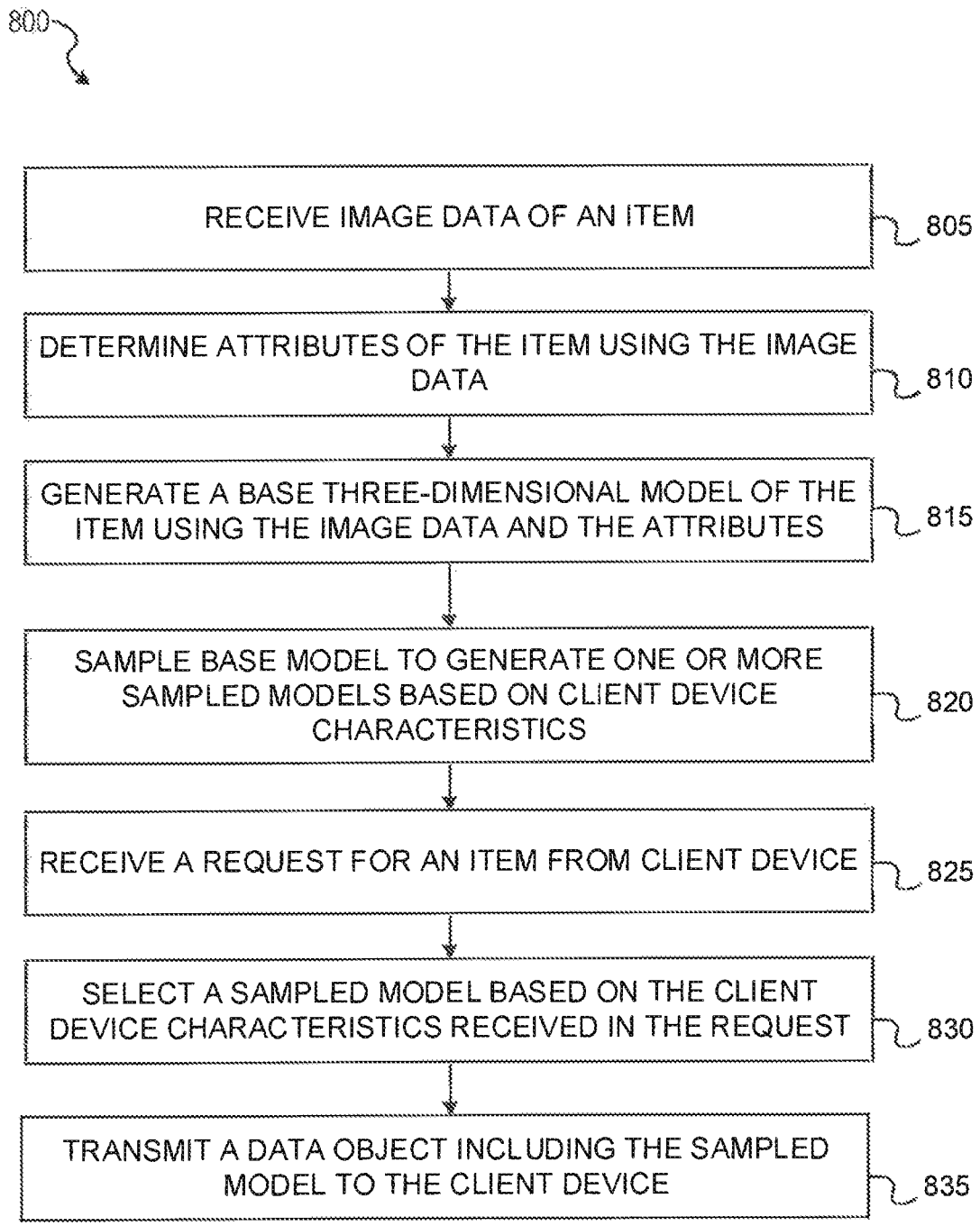
FIG. 8 is a diagram of a set of operations for operating a back-end system that is associated with a network-based system for generating, and interacting with, a three-dimensional model of an item, according to various embodiments.

FIG. 8 is a diagram of process 800 for operating a back-end system that is associated with a network-based system for generating, and interacting with, a 3D model of an item, according to various embodiments. The process 800 may be executed by a computing system such as the back-end processing system 205. At 805, the back-end system may receive image data of an item. Such image data may include digital pictures or a video showing views, from two or more perspectives or orientations, of an item sold by a seller. At 810, the back-end system may analyze the image data to determine attributes of the item. Such attributes may include color, texture, physical condition, and other characteristics of the item. The back-end may create a mapping between the attributes and specific locations or points on a surface of the item. At 815, the back-end system may generate a base 3D model, such as a high-resolution 3D geometry mesh or polygon model, of the item using the image data and the attributes.

At 820, the back-end system may sample the base 3D model to generate one or more sampled 3D models of the item. The one or more sampled 3D models may have a resolution, a complexity, or other properties determined based on one or more device characteristics of a client device configured to render the sampled 3D model. Such properties may be selected to improve the speed at which the client device may render the sampled 3D model, such as by reducing the size or complexity of the sampled 3D model, thereby reducing the computing resource needed to render the sampled 3D model.

At 825, the back-end system may receive a request for a 3D model of an item from a client device. Such request may include an identifier of the item and one or more device characteristics of the client device. In some embodiments, the identifier of the item and one or more device characteristics may be received in different communications from the client device.

At 830, the back-end system may select a sampled 3D model of the item using the received identifier and the one or more of the client device characteristics. In some embodiments, selecting the sampled model can include generating a constraint satisfaction problem using the client device characteristics as constraints and adjustable parameters of the 3D model (e.g., model resolution, or the number of primitives in the model) as variables that may be solved. A solution to the constraint satisfaction problem may then me used to generate an optimized model for the client device, or to act as search parameters in a database of previously generated models to select a model that is optimized to most closely satisfy the client device characteristics. In some embodiments, the identifier and the client device characteristics can be used as parameters in a similarity equation or model which may be used select, from a database of previously generated 3D models matching the identifier, a sampled model that most closely satisfy the client device characteristics.

At 835, the back-end system may transmit a data object including the sampled 3D model to the client device, such as to cause the client device to render the sampled 3D model using one or more local graphics processing circuit of the client device. In some embodiments, the data object may include 3D geometric data representing the sampled 3D model. The data object may also include texture, color, physical condition, and other characteristics data associated with the item and mappable, through the rendering process, to a surface of the sampled 3D model.

Figure 9:
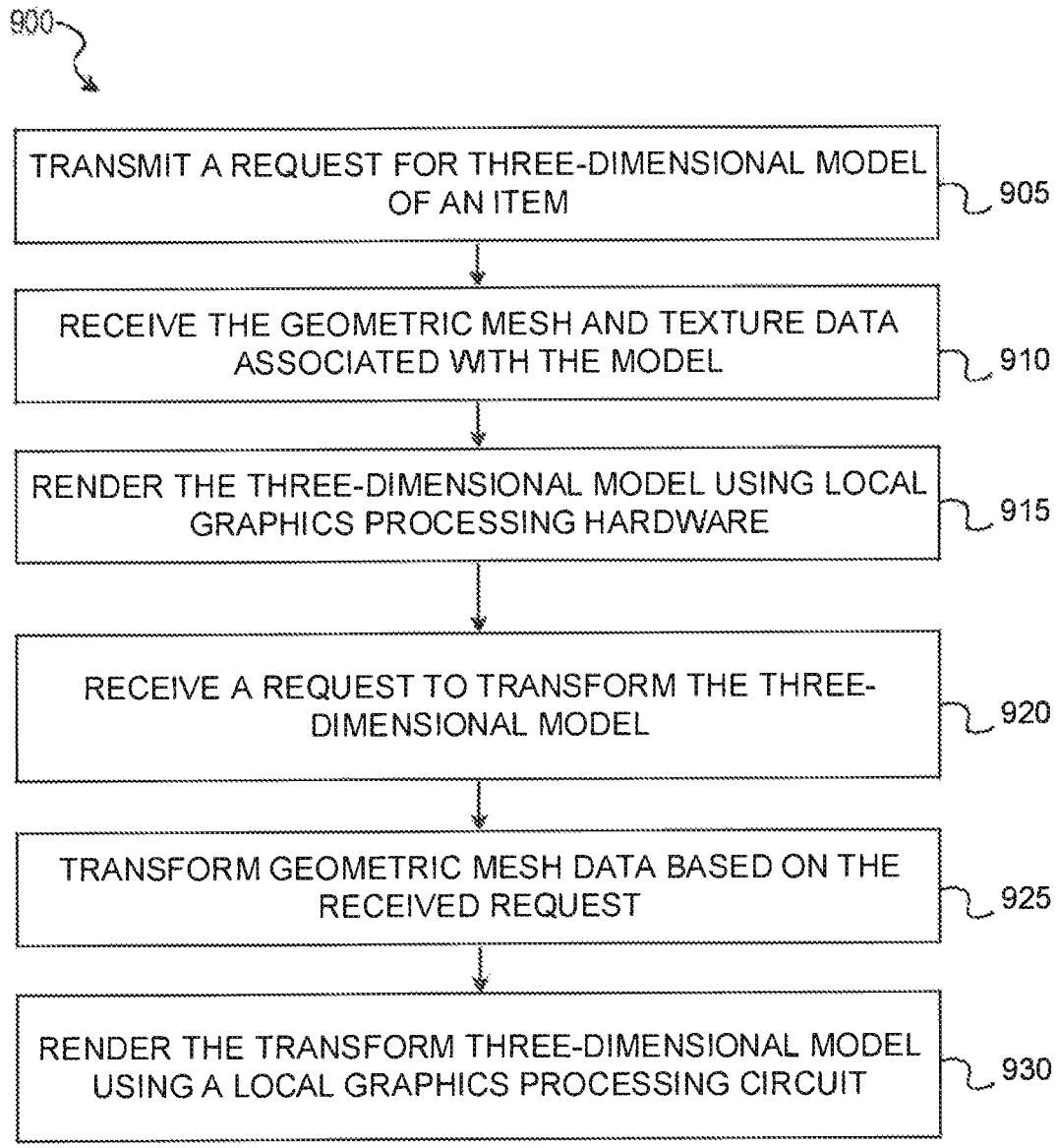
FIG. 9 is a diagram of a set of operations for operating a front-end system that is associated with a network-based system for generating, and interacting with, a three-dimensional model of an item, according to various embodiments.

FIG. 9 is a diagram of a process 900 for operating a front-end system that is associated with a network-based system for generating, and interacting with, a three-dimensional model of an item. The process 900 may be executed by the front-end system 405 to retrieve, render, and transform an 3D model of an item on a client device.

At 905, the frond-end system may transmit a request for a 3D model of an item. At operation 910 the front-end system may receive one or more a data objects or data structures populated with 3D geometric data representing the 3D model. The one or more a data objects or data structures may also be populated with texture data that is mappable to a surface of the 3D model. At operation 915, the front-end system may render the 3D model using one or more local graphics processing circuit, such as graphics processing unit of the client device. At operation 920, the front-end system may receive a request to transform the 3D model. Such transformation may include rotating, scaling, and translating the 3D model. At operation 925, the front-end system may transform the 3D model in response to receiving the request. Such transformation may include operating on the 3D geometric data, as described herein. At 930, the front-end system may render the transformed 3D model using one or more local graphics processing circuits.

Figure 10:
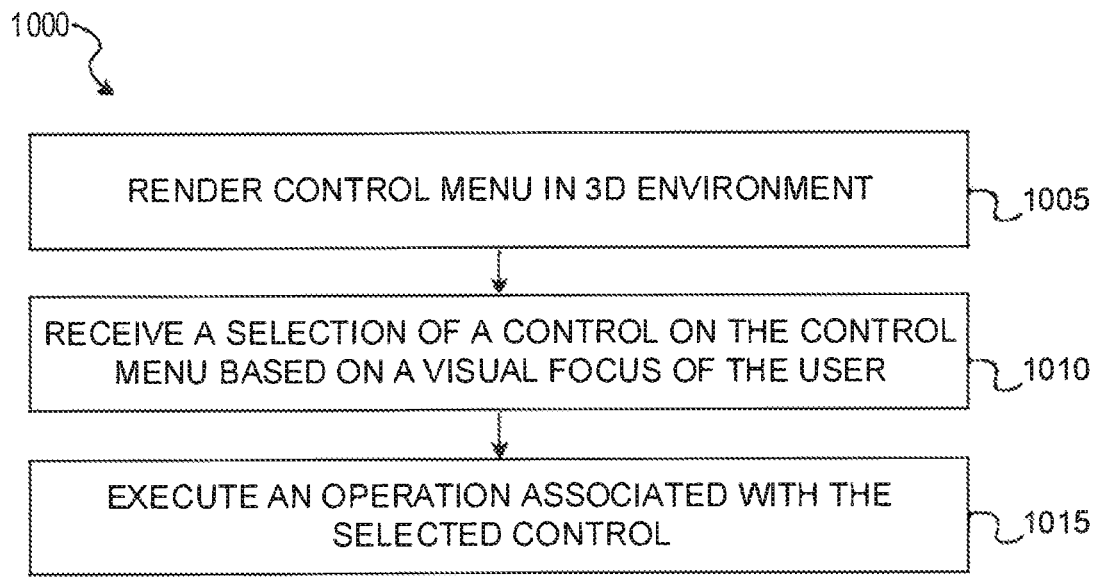
FIG. 10 is a diagram of a set of operations for interacting with a front-end system that is associated with a network-based system for generating, and interacting with, a three-dimensional model of an item, according to various embodiments.

FIG. 10 is a diagram of a process for interacting with a front-end system that is associated with a network-based system for generating, and interacting with, a three-dimensional model of an item, according to various embodiments. The process 1000 may be executed by the front-end system 405 to receive and process user input in an immersive 3D environment, such as an environment rendered through an immersive graphical user interface device, based a visual focus of the user. At 1005, the front-end system may render one or more controls in the immersive 3D environment. Such controls may enable a user to rotate, scale or translate a 3D model of an object. Such controls may enable a user to navigate between renderings of two or more 3D objects. Such controls may also enable a user to obtain or display information about a rendered 3D model of an item. At 1010, the front-end system may receive a selection of a control from the control menu based on a visual focus of the user. At 1015, the front-end system may execute one or more operations associated with the selected control, as described herein.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 11:
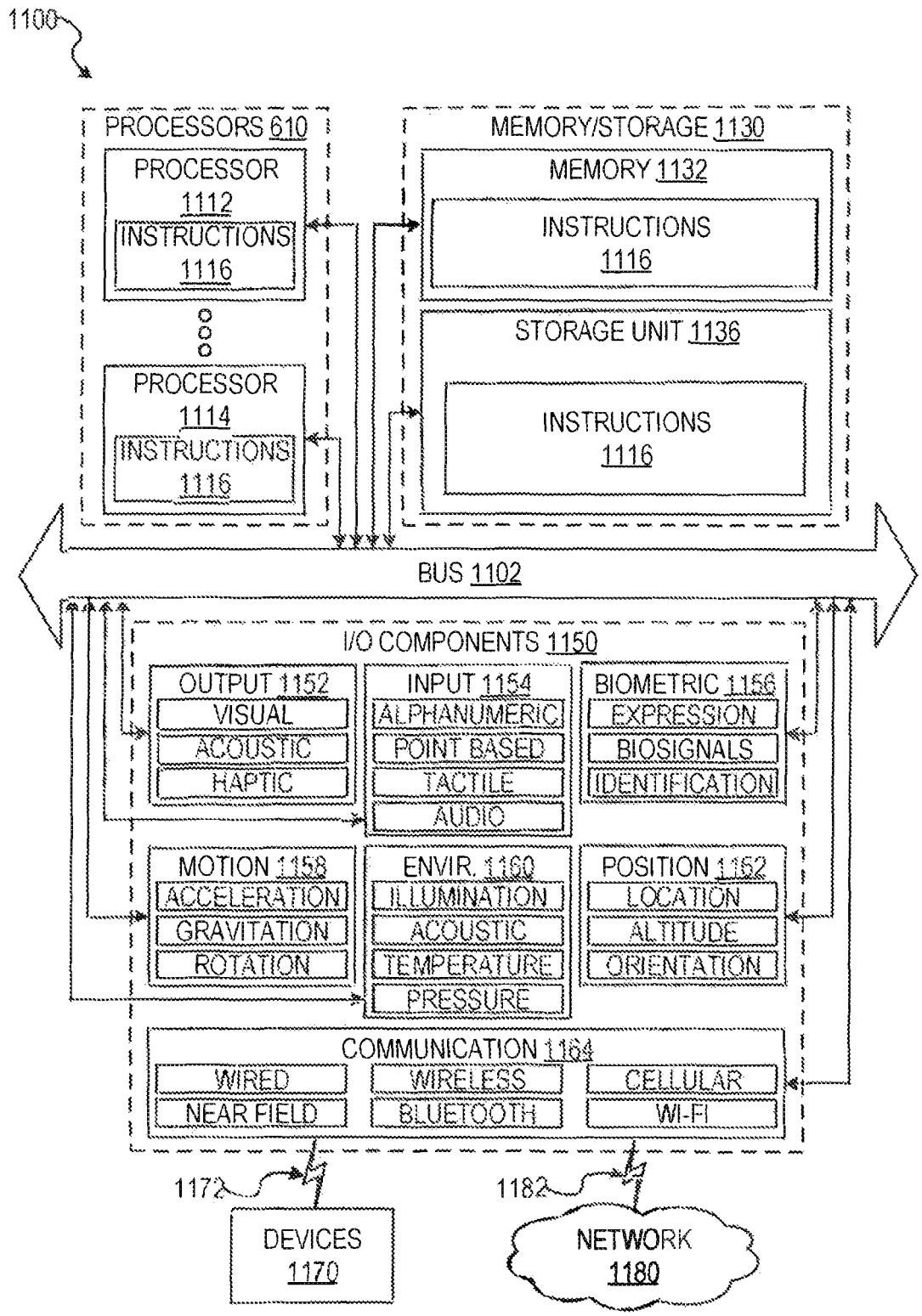
FIG. 11 illustrates a diagrammatic representation of a machine in the form of a computer system within which a set of instructions may be executed for causing the machine to perform any one or more of the methodologies discussed herein, according to various embodiments.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions may cause the machine to execute the flow diagrams of FIGS. 8-10. The instructions transform the general, non-programmed machine into a particular machine programmed to carry out the described and illustrated functions in the manner described. In alternative embodiments, the machine 1100 may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine"

shall also be taken to include a collection of machines 1100 that individually or jointly execute the instructions 1116 to perform any one or more of the methodologies discussed herein.

In some embodiments, the instructions 1116 may include software applications and associated processes such applications 110, 130, 140, and 165.

The machine may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CSC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (OPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi®, components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as, location via Internet Protocol (IP) geo-location, location via Wi-FI® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method performed at a server, the method comprising:
extracting points from each of a plurality of images depicting different two-dimensional orientations of an item, to generate geometric data comprising geometric primitives and visual elements of the item;
generating, using the geometric data, a base model of the item;
receiving, from a user device, a request to view the item;
generating, from the base model and based on one or more input parameters, a device-specific three-dimensional (3D) model of the item by removing at least one geometric primitive from the base model while preserving one or more of the visual elements, wherein the one or more visual elements comprise at least one projection boundary, at least one surface contour, or combinations thereof,
wherein the one or more input parameters comprise:
one or more device characteristics of the user device,
a desired number of geometric primitives, and
an indication to preserve the one or more visual elements, and
wherein the device-specific 3D model comprises:
the desired number of geometric primitives, and
the preserved one or more visual elements; and
transmitting, to the user device, a data object comprising the device-specific 3D model, wherein the data object comprises data for generating a binocular rendering of the device-specific 3D model.

2. The method of claim 1, further comprising:
determining, based on image data associated with the plurality of images, physical attributes of the item, wherein the physical attributes comprise at least texture data of the item.

3. The method of claim 1, wherein the geometric data comprises a geometric mesh of three-dimensional points determined using texture data.

4. The method of claim 1, wherein the one or more device characteristics comprise a display resolution of the user device, a processing capability of the user device, or a display interface of the user device.

5. The method of claim 1, wherein the request to view the item comprises a request to view a 3D model of the item.

6. The method of claim 1, further comprising receiving user input comprising the one or more input parameters.

7. The method of claim 1, wherein the binocular rendering of the device-specific 3D model is configured for presentation on at least one of: an augmented reality display device or a virtual reality display device.

8. A non-transitory, computer-readable storage medium storing instructions, that when executed by at least one processor, cause a system to perform operations comprising:
extracting points from each of a plurality of images depicting different two-dimensional orientations of an item, to generate geometric data comprising geometric primitives and visual elements of the item;
generating, using the geometric data, a base model of the item;
receiving, from a user device, a request to view the item;
generating, from the base model and based on one or more input parameters, a device-specific three-dimensional (3D) model of the item by removing at least one geometric primitive from the base model while preserving one or more of the visual elements, wherein the one or more visual elements comprise at least one projection boundary, at least one surface contour, or combinations thereof,
wherein the one or more input parameters comprise:
one or more device characteristics of the user device,
a desired number of geometric primitives, and
an indication to preserve the one or more visual elements, and
wherein the device-specific 3D model comprises:
the desired number of geometric primitives, and
the preserved one or more visual elements; and
transmitting, to the user device, a data object comprising the device-specific 3D model, wherein the data object comprises data for generating a binocular rendering of the device-specific 3D model.

9. The non-transitory, computer-readable storage medium of claim 8, wherein the instructions, when executed by the at least one processor, causes the system to perform operations comprising:
determining, based on image data associated with the plurality of images, physical attributes of the item, wherein the physical attributes comprise at least texture data of the item.

10. The non-transitory, computer-readable storage medium of claim 8, wherein the geometric data comprises a geometric mesh of three-dimensional points determined using texture data.

11. The non-transitory, computer-readable storage medium of claim 8, wherein the one or more device characteristics comprise a display resolution of the user device, a processing capability of the user device, or a display interface of the user device.

12. The non-transitory, computer-readable storage medium of claim 8, wherein the request to view the item comprises a request to view a 3D model of the item.

13. The non-transitory, computer-readable storage medium of claim 8, wherein the instructions, when executed by the at least one processor, cause the system to perform operations comprising receiving user input comprising the one or more input parameters.

14. A system comprising:
at least one processor; and
memory storing instructions, that when executed by the at least one processor, cause the system to:
extract points from each of a plurality of images depicting different two-dimensional orientations of an item, to generate geometric data comprising geometric primitives and visual elements of the item;
generate, using the geometric data, a base model of the item;
receive, from a user device, a request to view the item;
generate, from the base model and based on one or more input parameters, a device-specific three-dimensional (3D) model of the item by removing at least one geometric primitive from the base model while preserving one or more of the visual elements, wherein the one or more visual elements comprise at least one projection boundary, at least one surface contour, or combinations thereof,
wherein the one or more input parameters comprise:
one or more device characteristics of the user device,
a desired number of geometric primitives, and
an indication to preserve the one or more visual elements, and
wherein the device-specific 3D model comprises:
the desired number of geometric primitives, and the preserved one or more visual elements; and transmit, to the user device, a data object comprising the device-specific 3D model, wherein the data object comprises data for generating a binocular rendering of the device-specific 3D model.

15. The system of claim 14, wherein the instructions, when executed by the at least one processor, further cause the system to determine, based on image data associated with the plurality of images, physical attributes of the item, wherein the physical attributes comprise at least texture data of the item.

16. The system of claim 14, wherein the geometric data comprises a geometric mesh of three-dimensional points determined using texture data.

17. The system of claim 14, wherein the one or more device characteristics comprise a communication bandwidth between the user device and the system, a display resolution of the user device, a processing capability of the user device, or a display interface of the user device.

18. The system of claim 14, wherein the request to view the item comprises a request to view a 3D model of the item.

* * * * *